Oct. 18, 1949.  W. F. ROLLMAN  2,485,318
METHOD AND APPARATUS FOR CONTACTING
SOLIDS AND GASES
Filed April 17, 1946
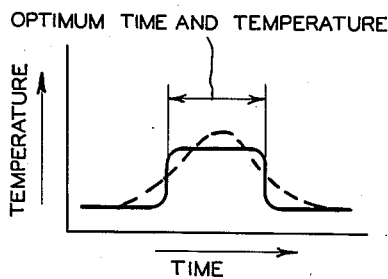
Fig. I
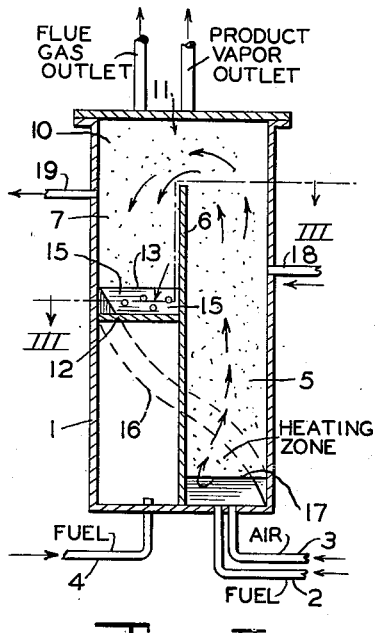
Fig. II
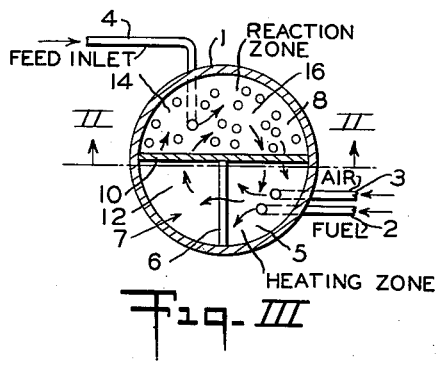
Fig. III
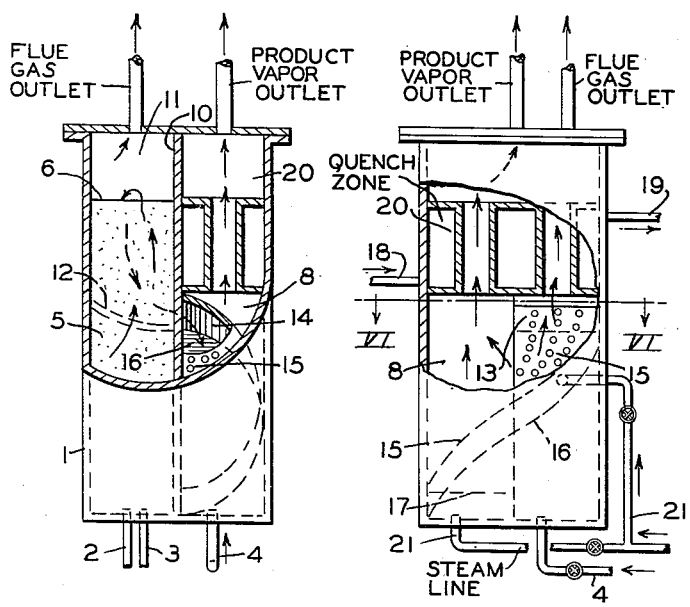
Fig. IV     Fig. V
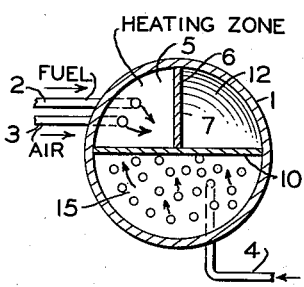
Fig. VI
INVENTOR
WALTER F. ROLLMAN
BY J. Cashman
ATTORNEY Patented Oct. 18, 1949

2,485,318

UNITED STATES PATENT OFFICE 2,485,318

METHOD AND APPARATUS FOR CONTACTING SOLIDS AND GASES

Walter F. Rollman, Cranford, N. J., assignor to Standard Oil Development Company, a corporation of Delaware Application April 17, 1946, Serial No. 662,908

8 Claims. (Cl. 196—52)

1

The present invention is fully described in the following specification and claims considered in connection with the accompanying drawing.

In my co-pending application, Serial No. 578,436, filed February 17, 1945, I have disclosed and claimed a method of producing a mixture of carbon monoxide and hydrogen suitable, for example, as a starting material in the production of hydrocarbons boiling in the gasoline boiling range and higher according to one of the known hyrdocarbon synthesis methods, such as the so-called Fischer-Tropsch. In that application the novelty resided largely in the use and operation of a reactor providing means for permitting the circulation of a solid in contact with a gaseous material in a single vessel through the several stages of an operation without having recourse to transfer pipes, valves, and control.

According to the present invention, which is a modification of that disclosed in my said prior application, I have provided means for contacting a solid with a gas at high temperatures during a short and closely controlled contact time, which is a valuable desideratum in a number of commercial operations; and here also I have provided means for effecting a free flow of solids in contact with a gas through the several stages of an operation without the use of conduits and valve means, all of which will appear more fully hereinafter.

One object of the present invention is to provide improved means for carrying out chemical endothermic and exothermic reactions, side by side, contiguously, but out of actual contact, in the same generally confined space.

A more specific object of my invention is to provide improved means for carrying out reactions (e. g. cracking of hydrocarbons) at high temperatures in which short contact time is desirable and where it is further desirable to heat the reactants rapidly to the optimum temperature and as rapidly cool them after they have been maintained at the desired temperature for the desired period of time.

A still further object of my invention is to carry out exothermic or endothermic reactions under optimum conditions in the presence of a solid catalyst material and at the same time to provide means for cooling or heating the catalyst and in this manner effect temperature control,

2 both the main reaction and the catalyst cooling or heating being effected continuously in the same generally confined space, and causing flow of the solid catalyst through the reaction and cooling zones without necessitating the use of moving parts and/or valve means.

Other and further objects will be apparent to those who are familiar with the chemical arts.

The proposed method operation will be better understood by the following statement of the principle upon which it is based. Reference is made to the heating and cooling curves obtainable by conventional and the proposed method of operation shown in Figure I.

It is axiomatic that for each reaction there is an optimum time and temperature, but it is not possible to more than approximate ideal conditions by conventional methods of heat exchange because of the time required to heat the feed and then cool the products to a temperature level at which undesired reactions will not take place. This situation is exemplified by the dashed line in Figure I.

However, the temperature of a fluid may be very quickly changed through a wide range by contacting the fluid with a large surface, a granular solid, for example, at the desired temperature level. It is thus possible to heat process feed to reaction temperature rapidly and subsequently quench the product by alternate contact with hot and cold granular or powdered solids and thus hold the reactants at reaction temperatures for any desired period of time. This possibility is illustrated by the solid line in Figure I.

Obviously, except in those rare instances wherein the reaction automatically seeks the optimum temperature, the heat exchange solids used for the purpose of controlling temperature must themselves be constantly circulated through a heat exchange zone in order that their temperature be maintained at the desired level. In other words, fluidized or moving beds must be employed. Laboratory experience indicates that due to channeling, momentary entrapment of fluid (gas or vapor) and internal circulation of fluid with the solid, residence or contact time in a "fluidized" bed of solids is by no means the same for each particle of fluid passed through the bed. Consequently, fluidized beds are not suitable for achieving the desired uniformity of contact time necessary to approximate optimum reaction conditions, although they can be used for the quenching step wherein some difference in contact time is not harmful. A better method of achieving uniformity of contact between fluid and solid is to force the fluid through a bed of comparatively coarse granules at such velocity that the solid is substantially undisturbed or agitated thereby, said bed simultaneously being moved through the reaction zone. A convenient way of doing this is to pass the reactant fluid upflow through an inclined bed of comparatively coarse granular solid which is permitted to gravitate through a reaction zone. Quenching is preferably accomplished in a fluidized powdered solid material disposed immediately above the moving bed of granular material. By means of this combination of contact of a reactant with a moving bed followed by quenching of the product by contact with a cool fluidized solid, the optimum time-temperature curve for most reactions may be closely approximated as exemplified by the solid line shown in Figure I. This method of operation is incorporated in the reactor hereinafter described and the definite control of reaction conditions obtainable thereby is one of its principal advantages.

The construction and method of operation of the reactor will now be described in connection with the accompanying drawings, assuming for the purpose of the description that the reactor is to be used for high temperature non-catalytic cracking of low molecular weight hydrocarbons. The equipment is, of course, adapted to many other processes, including catalytic reactions as well.

In Figure II, I have shown in section a front elevation of a reactor taken along line II—II of Figure III; in Figure III, I have shown a cross-section of the reactor taken along the line III—III of Figure II; Figure IV is a side view partially in section viewed from the right; Figure V is a rear view partially in section of the reactor; and Figure VI is a cross section taken along the line VI—VI of Figure V.

Similar reference characters refer to similar parts throughout the several views.

Referring in detail to Figures II to VI, inclusive, 1 represents a case, cylindrical in shape, which is divided into three compartments, as follows: a vertical partition divides the cylinder into two compartments or zones, one of which is 8 and the other of which is further divided by a vertical partition into zones 5 and 7. Referring in particular to Figure IV, it will be noted that partition plate 10 extends the length of case 1 from top to bottom, while in Figure II, it will be noted that partition 6 extends from the bottom of the vessel or case to the height indicated in the last-named figure. Compartment or zone 5 is a heating zone and a fuel and air (e. g. a gaseous fuel) are introduced into the bottom of zone 5, the fuel entering via line 2 and the air through line 3 and the former is burned therein. In describing the operation, I shall start with the heating zone which contains a mass of inert solid, such as sand, pumice, ground clay, or the like, which inert material has a particle size of from 20 to 40 mesh. The burning fuel passes upwardly through the heating section 5 and the velocity of the gasiform material in the said section 5 is so controlled that the solid material, which is preferably granular, is conveyed pneumatically upward and at the same time, of course, heated to some desired temperature by combustion of the fuel until it reaches a point just above the height of the partition 6 whereupon it gravitates into section 7. A study of the drawing will reveal the reason for this in connection with the following explanation. The velocity of the gas in section 5 is controlled so as to cause lifting of the solids in section 5 in such a manner that it is in the form of a more or less dense suspension, but when the suspension has risen above the height of partition plate 6, the velocity of the gasiform material will be greatly reduced since it enters a larger space, that is to say, a space corresponding to a semi-cylinder in cross section. This space is designated as 11 and, as indicated, serves as a disengaging space in which the solid is separated from the fumes and descends into section 7. In section 7 the heated solids pass by gravity downwardly until they contact an inclined baffle 12 (see Figure IV) which is in communication with the lower edge of a slot or opening 13 in partition 10. The slot is in registry with a helical conduit 14 which is the reaction zone and which has a perforate roof 15 and a perforate floor 16. The conduit 14 receives the down-flowing heated solids and conveys them from zone or chamber 7 through semi-cylindrical chamber 8 to a second slot 17 disposed at the bottom of partition 10, from which they are discharged into the bottom of heating section 5, thus completing a trip of the solids through the system.

The reactant, which may be, as stated, a hydrocarbon gas such as propane, which it is desired to crack, enters the bottom of zone or compartment 8 through a feed line 4 and passes upwardly, entering the conduit 14 via the perforations in the floor 16, and after contacting the heated solids therein going downwardly, emerges from the said conduit through the perforations in the roof 15.

The hydrocarbon gas to be cracked in passing through the body of hot flowing solids is very rapidly heated to a high temperature (from some temperature well below cracking temperatures), all of which will be explained further in a subsequent specific example.

Since it is also a part of my present invention to quench rapidly the hot reaction products issuing from the conduit 14 to prevent undesired side reactions, I provide immediately above the conduit 14 a quenching section generally indicated 20 (see Figures IV and V). Disposed within the quenching zone is a tubular heat exchanger consisting, as usual, of a bundle of cooling tubes disposed between the conventional headers and into which a fluid cooling medium may be introduced for circulation through the cooling tubes from an inlet line 18, which fluid, after passing through the several tubes, is withdrawn through an outlet pipe 19. I also, however, dispose within the said quenching zone 20 a body of solids, such as pumice, sand, clay, and the like, which, however, has a particle size of the order of 100 to 200 mesh and, therefore, is adapted for fluidization by the rising reaction products. Thus, the rising reaction products emerge from the conduit 14 passing upwardly through a mass of fluidized powdered material which is cooled by heat exchange with the cooling fluid in the heat exchanger. As is usual in a fluidized mass of powdered solids, the temperature of the same solids may be maintained at a nearly uniform temperature throughout its mass due to the turbulence of the individual particles contained therein, and thus the hot reaction products are rapidly cooled by heat exchange with the fluidized solids disposed in space 20 to a temperature well below that which would permit undesired side reactions. I have found that more rapid cooling may be achieved by contacting the hot reaction products with a cool solid than by passage of the hot reaction products through a conventional heat exchanger. The fact that there may be an appreciable time lag in the cooling of the solids in heat exchange relationship with the cooling medium in the heat exchanger does not affect the feasibility of the quenching feature of the process if the solids are cooled in a reasonable time, and it is only important that the solids be cooled well below reaction temperatures when they contact the hot reaction products emerging from the conduit 14. As indicated, the contact of the hot products of reaction with the solids, the latter at a widely lower temperature, causes virtually instantaneous cooling of the said hot products to a temperature below that at which undesired side reactions occur.

Referring again to the partition plate 10 which is co-extensive with the case 1 in height, it will be recalled that slots 13 and 17 permit flow of solids between the burning or reheat zone 5 and the compartment or chamber 8. In order to prevent the flow of reaction gas (propane, in the example given) into the chamber 5, I inject steam via line 21 into points at near the ends of the conduit 14 so as to exclude air or fuel therefrom, and also prevent reactants from entering chambers 5 or 7.

As I have indicated, the process takes place in a single cylindrical vessel divided by partitions into several compartments or chambers through which an inert solid moves continuously from reheat zone to reaction zone and back to reheat zone. Slide valves are not required because the process is indifferent to the rate of movement of the inert solid provided it is sufficient to supply the necessary heat of reaction. Movement of the solid is established and maintained by air and fuel gas rising through the reheat sections and combustion of the fuel maintains the temperature of the inert solid. If desired, the reactor may be further divided so that several complete cycles (of cracking and reheating) may be completed in one trip of solids around the vessel.

The described method of operation is adaptable to many processes but, as indicated above, it is especially applicable to processes requiring several and closely controlled conditions for optimum results. Possible non-catalytic applications include (1) the coking of petroleum residua (the advantage of high temperature, and the feasibility of coking in the presence of fluidized solids have been demonstrated), (2) the thermal dealkylation of aromatics, and, in particular, (3) very high temperature cracking of low molecular weight hydrocarbons for the production of acetylene, carbon black, hydrogen, etc. The proposed process has the advantages over conventional regenerative cracking for the latter purpose of (a) continuous instead of cyclic operation, (b) constant operation at optimum conditions, (c) improved control of conditions, (d) absence of inert gas in the product, and (e) more efficient utilization of the feed.

A specific example which will serve to illustrate my invention involves thermal cracking of propane in the following manner. In this case it is assumed that the propane is first cracked largely to acetylene in the hot reaction zone and the acetylene is subsequently polymerized to aromatics in the quench zone, which is maintained at about 1100° F. for the purpose. Since high temperatures are necessary, the reaction and reheat zones are lined with refractory.

Cold propane or propane heated to, say, 800° F., more or less, is passed upflow through a bed of 20 to 40 mesh sand heated to about 2450° F. moving through the reaction zone in a layer about 1″ thick, at a gas velocity of about one foot per second through the bed and a consequent contact time of 0.1 second. The propane is thus converted chiefly to acetylene, plus some hydrogen, other hydrocarbons, and carbon. The sensible heat of the sand in the reaction zone is large compared to the heat capacity and heat of cracking of the propane and consequently, the change in temperature of the sand in the reaction zone is small at moderate rates of movement of the sand through the zone. The sand is recycled by air rising through the reheat zone at a velocity of perhaps ten feet per second, to which sufficient fuel gas has been added to supply the necessary heat. Any carbon in the sand emerging from the reaction zone will, of course, also supply some heat of combustion in the reheat zone.

From the reaction zone the cracked gases pass to the quench zone, which in this case is maintained at about 1100° F. "Fused salt" (e. g. a mixture of KNO₃, KNO₂, and NaNO₃) may be used as coolant in the heat exchanger. Average residence time of the vapor in the quench zone is about 15 seconds, in which time most of the acetylene is converted to aromatics. Yields from propane by this technique are the following:

| | Weight per cent |
|---|---|
| Gas | 58 |
|   Hydrogen | 6 |
|   Methane | 23 |
|   Acetylene | 5 |
|   Ethylene | 21 |
|   Propylene | 3 |
| Liquid | 36 |
|   Benzene | 15 |
|   Toluene | 4 |
|   Xylene | 1 |
|   Higher aromatics | 10 |
|   Pitch | 6 |
| Carbon | 6 |

It is possible, of course, and in some cases preferable, to operate the quench zone at a lower temperature (e. g. 800° F.) and recover the acetylene as such. Higher yields than are obtainable by conventional methods may be expected.

An example of a process that is readily adaptable to the proposed method of operation is the catalytic vapor phase oxidation of naphthalene to phthalic anhydride. In this case air containing 1 volume per cent naphthalene vapor is passed up through a half-inch thick bed of 20 to 40 mesh particles of previously fused vanadium oxide at a vapor velocity of about 1 foot per second and a consequent contact time of about 0.04 second. From the reaction zone the vapors pass to the quench zone wherein they are cooled below reaction temperature. Any tendency for the vapors to fluidize the catalyst is minimized by the fact that the catalyst completely fills the reaction zone and entrainment of catalyst into the quench zone is prevented by screens at the quench zone inlet. The catalyst enters the reaction zone at a temperature of 900° F. and is heated by the liberated heat of reaction to about 1100° F. which, since it has been shown that this process is not particularly sensitive to reaction zone temperature, is not an excessive temperature rise. Catalyst residence time in the reaction zone at these conditions is about 15 seconds. The catalyst is lifted through the "reheat zone" by cool air, steam, or other medium moving at a velocity of 10 feet per second or more, which simultaneously cools the catalyst. If necessary, cooling coils may be installed in section 7 of the reactor.

Product distribution in the above described process in which naphthalene is converted to phthalic anhydride is as follows:

| | Mol per cent |
|---|---|
| Phthalic anhydride | 89 |
| Maleic anhydride | 1 |
| Quinones | 1 |
| $CO+CO_2$ | 1 |

To recapitulate, my present invention relates to a method of heating rapidly a gasiform material to reaction temperatures, maintaining the gasiform material at reaction temperatures for a relatively short period of time which may be as low as 0.01 of a second up to 1 to 2 seconds by contacting the gasiform material with a moving shallow bed of preferably granulated material which may be catalytic or non-catalytic. But the essence of my invention resides, as indicated, in heating the material rapidly, almost instantaneously, to reaction temperatures.

Numerous modifications of my invention may be made by those familiar with the art.

I claim:

1. An improved method for effecting vapor phase reactions in the presence of a granular solid material in a generally confined space containing at least one reaction zone and one reheating zone in communication with each other, which comprises charging a gasiform material to said reaction zone at a temperature below reaction temperatures, conducting said gasiform material upwardly in said reaction zone through a relatively shallow downwardly moving inclined bed of granular solids containing sufficient sensible heat to heat the gasiform material rapidly to reaction temperatures, said gasiform material being forced through the moving bed of granular solids at a velocity lower than that which will maintain the particles of said granular solid in turbulent suspension, said velocity also being such that the gasiform material is maintained at reaction temperatures for a period of from 0.01 to 2 seconds, withdrawing the reaction products from contact with the granular solids, immediately cooling said reaction products by subjecting them to the influence of a cooling medium in a cooling zone disposed in close proximity to said reaction zone, withdrawing solids from the reaction zone by natural flow and permitting them to enter the reheating zone, subjecting the said solids in the reheating zone to contact with an upwardly flowing heating gas whereby the said solids are reheated, the velocity of the upflowing heating gas being sufficient to cause the solids to move upwardly in the reheating zone concurrently with the heating gas, separating the thus heated solids from the heating gas at a point near the top of the reheating zone, separating the heated solids from the heating gas, permitting the heated solids to return by natural flow to the reaction zone and withdrawing reaction products from the cooling zone.

2. Method as set forth in claim 1 wherein the heating gas in the reheating zone comprises a gaseous fuel undergoing combustion.

3. The method set forth in claim 1 in which the moving bed of granular material in the reaction zone has a thickness of about one inch and in which the superficial vapor velocity of the reactants passing therethrough is about 1 foot per second.

4. The method set forth claim 1 in which the solid material is catalytic.

5. The method set forth in claim 1 in which the reaction is endothermic.

6. The method set forth in claim 1 in which the reaction is exothermic.

7. A continuous method for cracking hydrocarbons in the presence of granular solids in a cracking zone, reheating the granular solids in a reheating zone contained within the same generally confined space as the cracking zone, the said zones being contiguous and vertically disposed, and causing continuous circulation of said granular solids between the zones, which comprises heating the granular solids by introducing them into a stream of upwardly rising heated gas in the reheating zone, imparting sufficient velocity to the heated gas to carry the solids in suspension upwardly through the reheating zone, separating the solids from the heated gas, permitting the solids to flow from an upper point in the reheating zone into and downwardly through the cracking zone by natural flow in the form of a relatively shallow inclined bed, forcing gasiform hydrocarbons upwardly through the shallow moving bed of solids at a velocity lower than that at which the solids would be maintained in turbulent suspension, said velocity also being such that the gasiform hydrocarbons remain in contact with the moving bed of solids for a period of about 0.01 to 2 seconds, recovering desired cracked products from an upper point in the cracking zone and permitting the solids to return to the reheating zone by natural flow.

8. The method set forth in claim 7 wherein the granular solids are catalytic.

WALTER F. ROLLMAN.

REFERENCES CITED

The following references are of record in the file of this patent:

UNITED STATES PATENTS

| Number | Name | Date |
|---|---|---|
| 1,823,895 | Gray | Sept. 22, 1931 |
| 2,376,191 | Roetheli et al. | May 15, 1945 |
| 2,378,342 | Voorhees et al. | June 12, 1945 |
| 2,405,395 | Bahlke et al. | Aug. 6, 1946 |